(12) United States Patent
Burns

(10) Patent No.: US 8,977,563 B2
(45) Date of Patent: Mar. 10, 2015

(54) SYSTEM AND METHOD FOR ELECTRONIC TIME RECONCILIATION

(71) Applicant: PSC Industrial Outsourcing, LP, Houston, TX (US)

(72) Inventor: James K. Burns, New Castle, NH (US)

(73) Assignee: PSC Industrial Outsourcing, LP, Houston, TX (US)

(*) Notice: Subject to any disclaimer, the term of this patent is extended or adjusted under 35 U.S.C. 154(b) by 33 days.

(21) Appl. No.: 13/751,484

(22) Filed: Jan. 28, 2013

(65) Prior Publication Data

US 2013/0198049 A1     Aug. 1, 2013

Related U.S. Application Data

(60) Provisional application No. 61/591,496, filed on Jan. 27, 2012.

(51) Int. Cl.
| | |
|---|---|
| *G06F 15/02* | (2006.01) |
| *G07C 1/10* | (2006.01) |
| *G06Q 10/00* | (2012.01) |
| *G06Q 10/10* | (2012.01) |
| *G06Q 40/00* | (2012.01) |

(52) U.S. Cl.
CPC .......... *G06Q 10/1091* (2013.01); *G06Q 40/125* (2013.01)
USPC ........................................................ 705/32

(58) Field of Classification Search
None
See application file for complete search history.

(56) References Cited

U.S. PATENT DOCUMENTS

| | | |
|---|---|---|
| 5,068,787 A | 11/1991 | Pipella et al. |
| 5,493,492 A | 2/1996 | Cramer et al. |
| 5,606,497 A | 2/1997 | Cramer et al. |
| 5,696,702 A | 12/1997 | Skinner et al. |
| 6,954,148 B2 | 10/2005 | Pulkkinen et al. |
| 7,089,200 B2 | 8/2006 | Bode |
| 7,213,064 B2 | 5/2007 | Smith et a |
| 7,376,647 B1 | 5/2008 | Guyan et al. |
| 7,603,314 B2 | 10/2009 | Siksa |
| 7,623,985 B2 | 11/2009 | Finch, II et al. |
| 7,761,318 B2 | 7/2010 | Olson et al. |
| 8,121,912 B2 | 2/2012 | Pappas et al. |
| 8,209,243 B2 | 6/2012 | Smith et al. |
| 8,261,319 B2 | 9/2012 | Libin et al. |
| 8,290,808 B2 | 10/2012 | Brower, Jr. et al. |
| 8,321,313 B2 | 11/2012 | Livesay et al. |
| 8,386,346 B2 | 2/2013 | Magner et al. |
| 2003/0033167 A1 | 2/2003 | Arroyo et al. |
| 2003/0069815 A1 | 4/2003 | Eisenberg et al. |
| 2003/0227386 A1 | 12/2003 | Pulkkinen et al. |
| 2004/0006500 A1 | 1/2004 | Guicciardi |
| 2005/0216396 A1 | 9/2005 | Siksa |
| 2007/0094110 A1 | 4/2007 | McCrea |
| 2010/0145767 A1* | 6/2010 | Snow et al. ................... 705/10 |
| 2010/0211515 A1* | 8/2010 | Woodings et al. ............ 705/320 |
| 2012/0158607 A1 | 6/2012 | Burns et al. |
| 2013/0211975 A1 | 8/2013 | Masterson et al. |
| 2013/0218629 A1 | 8/2013 | Brower, Jr. et al. |

* cited by examiner

*Primary Examiner* — Paul Danneman
(74) *Attorney, Agent, or Firm* — Mark S. Leonardo; Brown Rudnick LLP

(57) ABSTRACT

The invention relates to systems, methods, and devices for automatically reconciling information among multiple records. Systems and methods of the invention are operable to automatically reconcile differences among a gatelog, a shift ticket, and an activity report by applying rules. Since the invention is able to automate and standardize the reconciliation, the results are rapid and predictable and conform to expectations.

8 Claims, 8 Drawing Sheets

Activity Report 111a

Job: Tank clean
Approved: 30 m
Req: 50' hose
2x technicians

Shift ticket 121a

Job: Tank clean
2 h

Gatelog 113a

Job: Tank clean
In          Out
1:51        3:15

Activity Report 111b

Job: Roll off Sep
Approved: 4 h
Req: Sep device
4 x tech

Shift ticket 121b

Job: Roll off Sep
4 h
1.5 h OT
4 techs

Gatelog 113b

Job: Roll off Sep
In          Out
10:00       4:00

Activity Report 111c

Job: 860 Sewers
Approved: 8 h
Req: Lrg Tanker
35X conduit
10 X tech

Shift ticket 121c

Job: 860 Sewers
8 h
conduit

Gatelog 113c

Job: 860 Sewers
In          Out
8:56        5:02

FIG. 3

SYSTEM AND METHOD FOR ELECTRONIC TIME RECONCILIATION

CROSS-REFERENCE TO RELATED APPLICATION

This application claims priority to and the benefit of U.S. Provisional Application No. 61/591,496, filed Jan. 27, 2012, the contents of which are incorporated by reference in their entirety.

FIELD OF THE INVENTION

The invention generally relates to the reconciliation of time records.

BACKGROUND

Many contractors go to customer facilities to perform services. For example, customers in the refinery, petrochemical, paper, steel, pharmaceutical, food, and automotive industries often contract with an outside firm for the contractor to come perform maintenance, repairs, construction, inspection, and related services at facilities such as factories, plants, oil fields, or other installations. Typically, a contract may identify certain amounts of time or materials that the contractor may expend performing the service. A contract may even specify allowed times or materials for a specific contractor. For example, a given contractor may be allowed to bill out up to 4 hours for a given pipe cleaning and to use up to 50' of hose at the customer's expense. After the service visit, the contractor will send an invoice billing for the expended time and materials. Some customers track these values in their own internal contract management programs.

Contractor firms may send their invoice from administrative offices that are not necessarily located near the site of service. For the administrator to prepare the invoice, he typically relies on the technician who performed the service to report the amounts of materials and time spent at the facility. For example, a technician may write up a shift ticket recording that a particular pipe-cleaning job required five hours and 100' of hose.

Problems arise at multiple levels. Technicians do not always accurately record their time. Obviously, this can damage the relationship between customer and contractor if, for example, a technician overbills. If the technician spends an hour on-site, and the bill is for two hours, the contractor may end up spending more time resolving the dispute than the entire service visit was worth. But more subtly, if the quantities on the shift ticket do not conform to the expectations of the parties, they may be handled inconsistently. Some administrators may write the bills down to an approved quantity, not knowing that overtime is approved. Some technicians may habitually round their time to the nearest hour, even if the result is that they consistently round down (e.g., every 8.5 hour day is written down as an 8 hour day). At another level, administrators introduce human error when they manually reconcile the shift tickets with reports from the customer's software. For a contractor to track services accurately and prepare invoices that conform with policies of the contractor and the customer requires administrative personnel to spend large amounts of time carefully inspecting all of the incoming information.

SUMMARY

The invention provides systems and methods for using information from a gatelog to reconcile information from shift tickets and contract management reports. Where conflicting values are found, such as difference exceeding some threshold, one or more rules are applied to determine a value that conforms with intents or expectations. When a technician uses a security device such as an electronic badge to go in or out of a customer's facility a gatelog is produced that contains a record of "badge-in" and "badge-out" times. Systems and methods of the invention integrate this customer document into a contractor's reconciliation process along with any report from the customer's contract management software. The contractor's computer system can then reconcile the gatelog and customer reports against the shift tickets or any other records. Problematic entries can be flagged as "exceptions" and can be resolved automatically within the system by the application of rules. Exceptions that meet some criterion can be flagged for human review as desired. Not only are time exceptions reconciled or resolved by an administrator (e.g., overtime approved, quantities adjusted, explanatory notes added), contract items (e.g., labor, equipment, materials) may be so allocated to produce a report containing amounts of materials and time that conform to contract expectations. The conforming report may be used in billing and may be automatically transmitted into the customer's contract management software.

Since manual reconciliation of the gatelog with the shift tickets and customer report is avoided, labor costs are minimized. Additionally, human error—which causes potential lost revenue, overbilling, or damage to customer relations—is avoided. Further, since default rules are used for reconciling exceptions, inconsistencies (some rounded up, some rounded down) or unwarranted actions (ignoring or deleting an odd-seeming entry from a bill) are avoided.

In certain aspects, the invention provides a method for reconciling invoice data. The method includes receiving, at a computer system, an activity report comprising an approved time for billing, a shift ticket comprising a reported billable time, and a gatelog comprising a badge-in time and a badge-out time. The badge-in time and the badge-out time are preferably generated by a person activating a security device at a facility entrance. A work duration is automatically determined based on the badge-in time and the badge-out time and a difference among the approved time for billing, the reported billable time, and the work duration is identified. A rule is applied to the difference to determine a conforming billable time and a conforming report comprising the conforming billable time is produced. In some embodiments, the rule provides that if the reported billable time equals the work duration then the conforming billable time is the reported billable time. Alternatively or additionally, the rule may provide that if the work duration is less than the reported billable time by a pre-determined amount, then the conforming billable time is determined by prompting for user input. The rule may provide that the approved time for billing is the conforming billable time unless the work duration is less than the approved time for billing by a preset threshold (e.g., zero, five minutes, six minutes, ten minutes, quarter of an hour, etc.). Any rule may be employed. For example, the rule could provide that the conforming billable time will be the higher of the approved time for billing and the reported billable time except that in no case will the conforming billable time exceed the work duration.

Preferably, the activity report and the gatelog is received automatically from an independent customer computer system. The method can further include transmitting the conforming report to the independent customer computer system (e.g., as an invoice).

In certain embodiments, systems and methods of invention reconcile items as well as time. For example, the activity report may include an approved equipment list and the shift ticket may include a list of equipment used. Application of the method can make a comparison between the list of equipment used and the approved equipment list and apply a rule to the comparison to determine a final equipment list. The conforming report may include the final equipment list.

In related aspects, the invention provides a computer system for reconciling invoice data. The system is operable to receive an activity report that includes an approved time for billing, a shift ticket comprising a reported billable time, and a gatelog. The system can automatically determine a work duration based on the badge-in time and the badge-out time; automatically identify a difference among the approved time for billing, the reported billable time, and the work duration; apply a rule to the difference to determine a conforming billable time; and produce a conforming report comprising the conforming billable time. Generally, the computer system will operate by means of a processor operably coupled to a tangible, non-transitory memory. In some embodiments, the system will include a network communication device operable to automatically receive the activity report and the gatelog from an independent customer computer system, to transmit the conforming report to the independent customer computer system, or both. The system may receive material generated by a tracking computer program running on the independent customer computer system.

In certain embodiments, the activity report will include an approved equipment list and the shift ticket will include a list of equipment used. The system may make a comparison between the list of equipment used and the approved equipment list. Further, the system may apply a rule to the comparison to determine a final equipment list. This can be done so that the system will produce a conforming report that includes the final equipment list.

In certain aspects, the invention provides a method of reconciling time using an electronic computer device that includes receiving a first and a second time value, comparing the first time value to the second time value to identify an exception, and applying a rule to determine an output time value. Any values can be written to a file. The time values can come from a gatelog, a shift ticket, manual input, or another source. In some embodiments, an exception is identified if a difference between a first time value and a second time value is greater than a preset criterion (e.g., 1 minute, 6 minutes, 7 minutes, 14 minutes, 15 minutes, an hour, a day, etc.). The output time can be obtained by choosing the larger of the first and second time values; choosing the smaller of the first and second time values; calculating the average of the first and second time values; choosing the first or the second time value based on an external criterion; or simply choosing the first time value.

In certain embodiments, the system receives information from a contract (i.e., "consults a contract", which can mean looking up data in a table in a database, the data in the table relating to a contract). After creating the output value, the data in the table or any other contract file or data may be updated. For example, a pre-set number of hours in a contract may be getting "billed out" over time.

In certain aspects, the invention provides an apparatus for electronic time reconciliation comprising an input device, an output device, and a memory coupled to a processor. The apparatus can receive data comprising a first and second time value, compare them to identify an exception, and apply a rule to determine an output time value. The apparatus can then write a file containing the output time value.

BRIEF DESCRIPTION OF THE DRAWINGS

FIG. 3 depicts documents that provide information.

DETAILED DESCRIPTION

The invention generally relates to systems and methods for reconciling reports of time and materials used in performing services. Embodiments of the invention are discussed in terms of a customer and a contractor. It will be recognized that these labels are illustrative of possible roles and are not limiting. Steps and operations as well as systems discussed herein may be attributable to one or more parties of any description. In some embodiments, a contractor is a firm that sends a technician to a facility, or site, of a customer to perform a service, such as cleaning, repair, building, maintenance, or inspection. The technician generally performs a service at the facility as described in a contract. The facility will generally have an entrance, such as a door or gate, that features a security device operable to record a technician's entrance or exit times.

Figure 1:
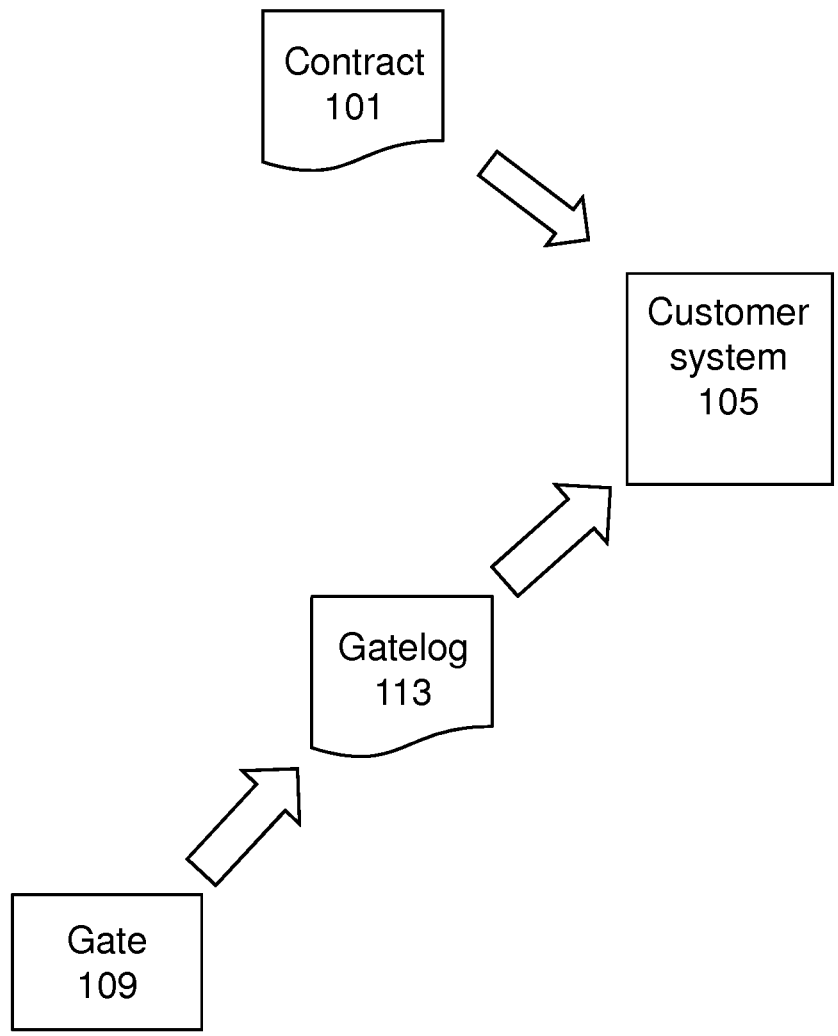
FIG. 1 diagrams work information from a customer perspective.

FIG. 1 shows how information may flow from the customer's perspective. A customer may decide to manage and administer a contract 101 through the use of a customer system 105, which can run software used for contract management. Contract management software can include office productivity software such as word processor or spreadsheets. In some embodiments, contract management software is provided by a purpose-built program such as the contract management software sold under the trademark ARIBA by Ariba, Inc. (Sunnyvale, Calif.) or that sold under the trademark EMPTORIS by IBM Corporation (Armonk, N.Y.). In certain embodiments, customer system 105 uses the software sold under the trademark TRACK by Track Software (Houston, Tex.).

A customer contracts for service to be performed at a facility at which there is a gate 109 with a security device. Typically, a customer will issue a badge to a technician, and the technician can use the badge to activate the security device and pass through gate 109. When a technician activates the security device to enter the facility via gate 109, this is deemed a "badge-in" event. Leaving the facility in this manner is deemed a "badge-out" event. Logging such events is discussed in U.S. Pat. No. 8,261,319 to Libin, the contents of which are incorporated by reference. The security device includes hardware that recognizes the presence of the technician at gate 109 and records badge-in and badge-out events. The security device can operate by RFID, GPS, biometric devices, or a computer kiosk that requires a PIN, password, or other data-based interaction. In certain embodiments, a badge is a device such as a plastic card that includes a readable-tag, such as an RFID chip. The security device can include a card reader. For example, security device 111 can include the card reader sold under the trademark DOORKING 1838 PC Programmable Access Controller by Hoover Fence Co. (Newton Falls, Ohio). Security device 111 can include the card reader sold under the name CGMCARD-IK by Cincinnati Gate Systems, Inc. (Cincinnati, Ohio). Security device 111 may optionally include a computer such as, for example, a desktop PC, running security software. In some embodiments, software functionality of security device 111 is provided by one or more software modules operable in customer system 105. Security device 111 produces gatelog 113, a document comprising a record of one or more badge-in or badge-out events.

Customer system 105 additionally may contain information related to the contents of contract 101. For example, for a given contractor, customer system 105 may contain information about certain jobs, materials, technicians, scheduled times, amounts of time, administrative rules (e.g., relating to the approval of overtime or after-hours service), other information, or a combination thereof. In certain embodiments, system 105 is operable to provide report relating to a scheduled service. The report may be provided in the form of an activity report and may be provided, for example, in advance of, simultaneous with, or after the schedule service. For example, if contract 101 includes that a service is to be performed on a certain day, then system 105 can generate a report for that day reporting that the service is scheduled to be performed. Additionally, the report can include information about technicians (e.g., identities of, numbers of, or both), materials, activities, or similar to be involved in the scheduled service. Such a report may be prepared, stored, used, or transmitted by the contract management software (e.g., TRACK) on system 105. In some embodiments, such a report is transmitted in the form of an activity report from system 105 to the contractor, for example, to be received by a computer system of the contractor.

Figure 2:
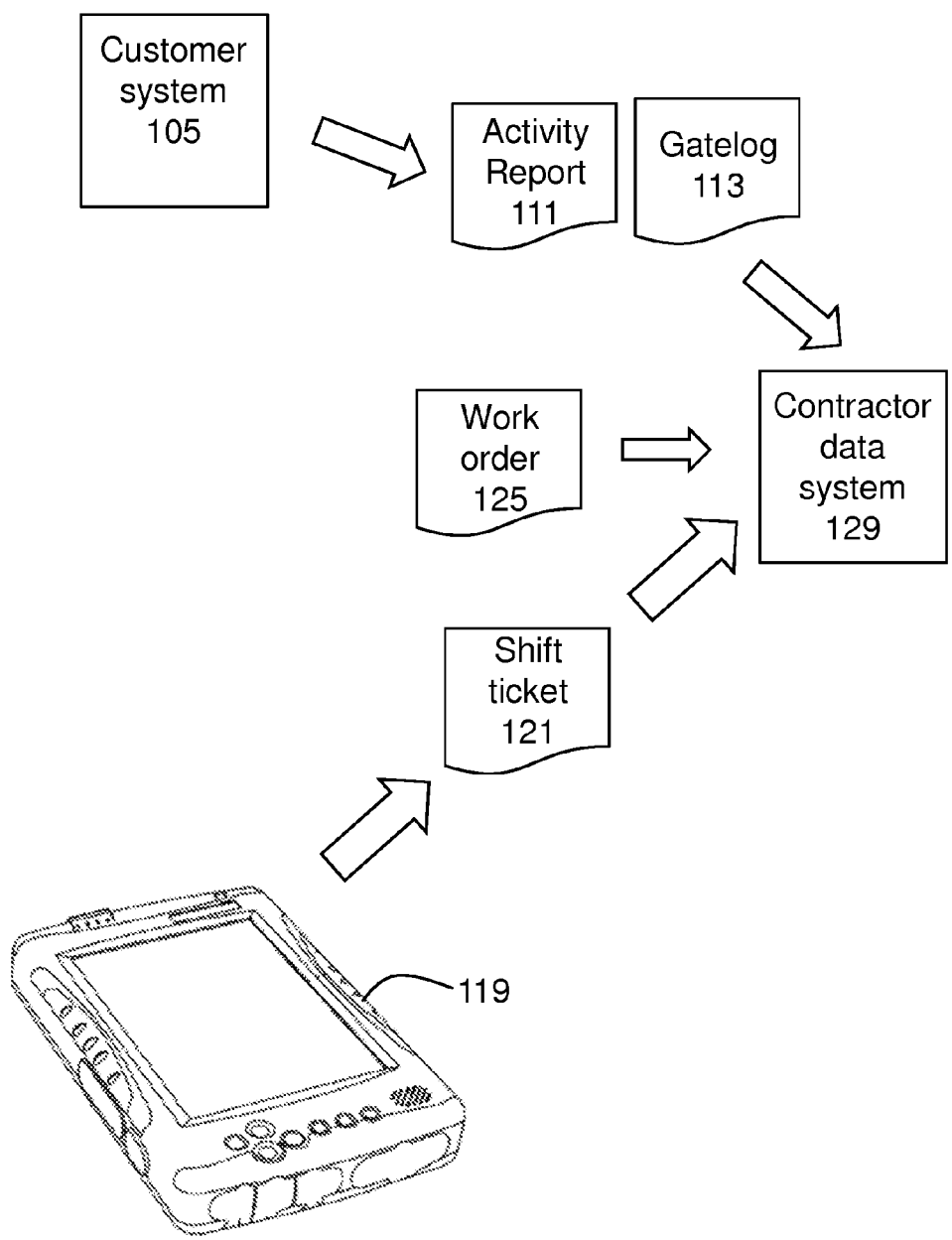
FIG. 2 shows information flow from a contractor perspective.

FIG. 2 relates how information may flow from the perspective of the contractors. For any given service event, the contractor may receive an activity report 111, a gatelog 113, or both. Preferably, the contractor uses a data system 129 to receive these reports. In some embodiments, contractor system 129 automatically retrieves this information from customer system 105. The contractor may additionally or alternatively make use of a work order 125 that provides information about technicians (e.g., identities of, numbers of, or both), materials, activities, or similar to be involved in the scheduled service.

When a technician performs a service at a customer's facility, they may submit information about the work performed. This information has uses in billing, payroll, record-keeping, other functions, or combinations thereof. This submission of information may be referred to as a shift ticket 121. In some embodiments, a technician submits shift ticket 121 to document a number of hours that were worked under contract 101. The contractor may then invoice the customer for this labor. Shift ticket 121 can be received via the contractor data system 129. For example, where shift ticket 121 is an electronic submission, information from shift ticket 121 can be transferred into the contractor's billing software and can be listed on a bill that the billing software provides to the customer. In some embodiments, a shift ticket contains a technician's reported billable time. For example, if the technician works for two hours, the technician may enter two hours' worth of reported billable time into shift ticket 121.

In some embodiments, systems and methods of the invention use a computer device 119 for tracking information. A technician may carry computer device 119 to the facility. When the technician performs the scheduled service, the technician may record hours worked, materials used, services performed, comments and notes, diagnoses, recommendations, other information, or a combination thereof into a shift ticket 121 for the scheduled service in computer device 119. Device 119 may be any suitable PC, laptop, tablet, smartphone, purpose-built device. In some embodiments, device 119 is the rugged tablet PC sold under the trademark TR3000 by Hewlett-Packard Company (Palo Alto, Calif.) or the rugged laptop sold under the trademark LATITUDE E6430 ATG by Dell Inc. (Round Rock, Tex.). Device 119 may be provided by the tablet computer sold under the trademark IPAD by Apple Inc. (Cupertino, Calif.) or by any other computer such as that sold under the trademark PORTEGE R835-P56x by Toshiba Corporation (Tokyo, Japan). Device 119 can be a handheld device as described, for example, in U.S. Pub. 2012/0158607 to Burns, the contents of which are hereby incorporated by reference in their entirety for all purposes. Within computer device 119, shift ticket 121 may have any suitable form such as, for example, a word processing document or spreadsheet. In some embodiments, shift ticket 121 is a database record with a format specific to software on contractor data system 129. The technician enters information (e.g., via a keyboard, touch screen, stylus, or other mechanism) to fill shift ticket 121. Then, shift ticket information is transferred to data system 129 (e.g., via wireless internet, a cellular data connection, or a data connection).

As a result, the contractor will have received at data system 129, shift ticket 121 and gatelog 113 and optionally activity report 111 (gatelog 113 may be contained within or as part of activity report 111, they may be separately transmitted digital material, or they may have some other—e.g., hybrid—format). With shift ticket 121, gatelog 113, and activity report 111 collected for one or a plurality of scheduled services, system 129 can analyze any contents, identify differences, and apply rules to determine values that conform to the expectations of the customer, contract 101, business principles, or the judgment of an administrative personnel. Customer system 105 can provide activity report 111 or other reports in a comma-separated value format or Excel spreadsheet format. These examples are non-limiting. For example, data can also be output as HTML, plain text, data-normal format, or XML.

FIG. 3 depicts three exemplary activity reports 111a, 111b, and 111c; shift tickets 121a, 121b, and 121c; as well as gatelogs 113a, 113b, and 113c. As shown in FIG. 3, series "a" relates to a "tank clean" service activity. Activity report 111a shows 30 minutes of approved time for billing. Shift ticket 121a shows 2 hours of reported billable time. Gatelog 113a shows a work duration of one hour and twenty-four minutes.

Series "b" relates to a "roll off sep" service activity. Activity report 111b shows 4 hours of approved time for billing. Shift ticket 121b shows 4 hours of reported billable time. Gatelog 113b shows a six hour work duration.

Series "c" relates to a "860 sewers" service activity. Activity report 111c shows 8 hours approved for billing. Shift ticket 121c shows 8 hours billable. Gatelog 113c shows 8 hours and 6 minutes' work duration.

Under prior art methods, series "a" in FIG. 3 may require manual reconciliation due to the fact that a technician appears to have submitted 2 hours while having spent less than 1.5 hours on-site. Under the prior art, series "b" may be problematic, as a technician appears to have spent two hours on-site outside of the scope of contract work. Under the prior art, series "c" may be problematic because all of the times are congruent and conforming but to determine this requires manual human examination, which is time-consuming. As discussed herein, the invention provides systems and methods for addressing these differences among the reports. Particularly, as discussed below, systems and methods of the invention are operable to (for each series) automatically determining a work duration based on the badge-in time and the badge-out time; automatically identifying a difference among the approved time for billing, the reported billable time, and the work duration; automatically arrive at a value for those times that is congruent with contract or expectations; flag certain cases for manual review; generate reports; or a combination thereof.

In certain embodiments, the invention provides systems and methods to automatically track activities of a technician, time, and materials used. The invention provides systems and methods for approval of exception reconciliation, allocation of contract items, billing, payment, financial management, payroll. Further, these functions can be performed within contractor system 129, using customer system 105 (e.g., through appropriate secure connections), or a combination thereof. Methods for time tracking or billing (e.g., for implement or using shift ticket 121 in contractor system 129) are discussed in U.S. Pat. No. 8,209,243 to Smith; U.S. Pat. No. 7,623,985 to Finch; and U.S. Pub. 2007/0094110 to McCrea, the contents of each of which are incorporated by reference in their entirety.

Contractor system 129 can accept gatelog 113 from contractor system 105 (e.g., as sent by contract management software) in the form of a ASCII delimited file (.csv) or Excel or XML or similar electronic format, which can be imported into contractor system 129. System 129 can be set to automatically access one or more of shift ticket 121, work order 125, or a combination thereof, as needed.

Figure 4:
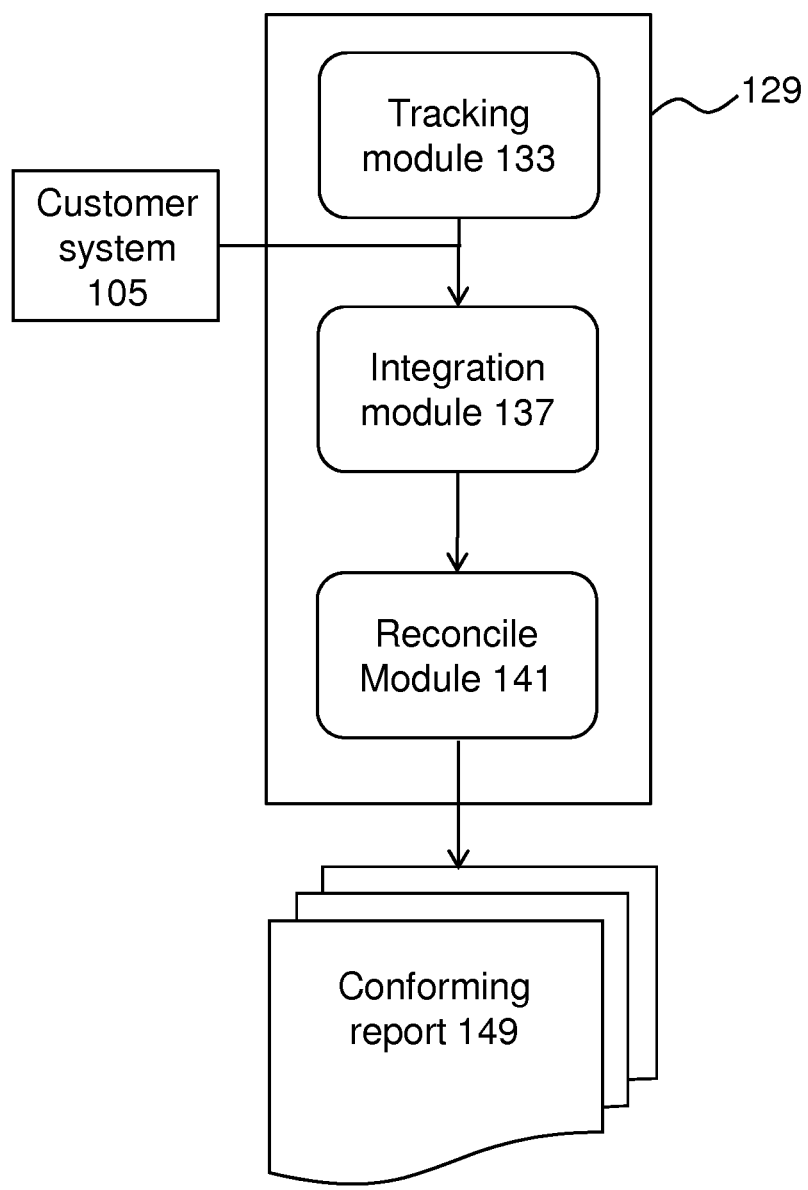
FIG. 4 presents a diagram of a contractor system.

FIG. 4 gives an overview of application data flow. As shown in FIG. 4, customer data system 105 (e.g., operating contract management software) may transmit data to contractor data system 129. Within data system 129, tracking module 133 may perform billing, payroll, or both functions. Integration module 137 identifies when some variable has differing values among ones of a shift ticket 121, gatelog 113, and activity report 111 within a set related to a single service event. A difference can be flagged as an "exception", indicating that it does not conform to a required standard (e.g., that durations indicated by a gatelog are not less than a technician's reported billable time). System 129 uses a reconcile module 141 to automatically resolve an exception, to flag an exception for human intervention, or to otherwise address exceptions (e.g., suspend activity on those records, hold that record for billing, etc.). In some embodiments, reconcile module 141 reconciles an exception by applying one or more rules to reconcile any difference that has been identified and to determine a conforming value for the variable that is differently represented within the set.

In some embodiments, reconciliation is a periodic process (e.g., daily). Once the gatelogs 113 and activity reports 111 for a particular day have been acquired, system 129 will fire the reconciliation rules and automatically flag any exceptions. Exceptions can be assigned to specific individuals to be resolved. Shift tickets 121 without exceptions can be immediately exported into a standard reporting method for feedback to the customer system 105.

In certain embodiments, exceptions are identified automatically and some or all of the exceptions are resolved automatically. Automatic generally means without any human intervention between the last specified human step and the next step that necessarily requires human intervention. To illustrate, a human technician may enter data for shift ticket 121 into device 119. After that, every step discussed herein may be performed automatically by systems of the invention until a bill is sent from contractor system 129 to customer system 105.

Figure 5:
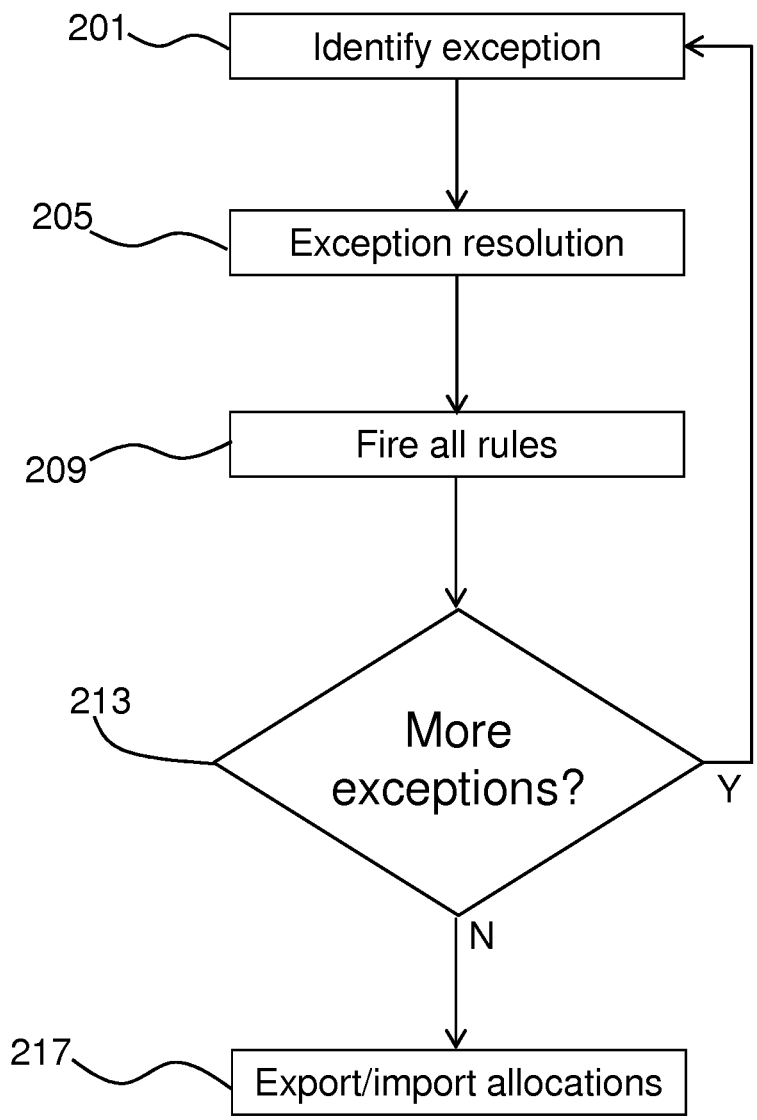
FIG. 5 charts the flow of methods according to some embodiments.

FIG. 5 charts the flow of methods according to some embodiments. Systems and methods of the invention are operable to identify 201 an exception. Generally, an exception is identified when there is disagreement between two corresponding entries in reports, the disagreement exceeding some pre-set tolerance limit. For example, if billing is in tenths of an hour, a first report identifies that someone was present for 41 minutes, and a second report indicates they were present for 51 minutes, an exception is identified. The exception will proceed to resolution 205. Exception resolution 205 includes selecting one or more rules applicable to the exception (e.g., "rounding rule", always round time up). User-defined rules will be fired 209. Here, fired indicates that system 129 executes program instructions that produce a conforming value for a variable according to logical criteria that have been established.

Rules can be any logical construct for providing a conforming value to be used for the disagreeing entries from the reports. Rules can embody industry-accepted practices (e.g., overtime is billed at time-and-a-half), logical inferences (reported billable time from shift ticket 121 is wrong if it exceeds work duration from gatelog 113), business agreements (each pipe cleaning event can have 2 hours' labor billed), simple defaults (approved time for billing from activity report 111 gets billed regardless of gatelog 113), others, or a combination thereof. Rules can include complex logical structures in which determinative operations are applied sequentially or conditionally. For example, sequential application could involve first use higher of approved time and reported billable time, and then limit to amount remaining to be billed in contract pool. A conditional application could involve using the approved time on the condition that reported billable time does not exceed work duration from gatelog.

In some embodiments, contract 101 includes values for totals for some item. For example, a contract can include that a series of service events can each include a labor item for, for example, pipe cleaning, up to the point that 100 hours (or any value) have been billed (e.g., within the course of a year). In an alternative illustrative example, a contract may specify that some material (e.g., reinforced hose) is to be used from the customer's supply to an extent before being billed by the contractor (or, to give another example, first 500 cubic feet of cement must be billed at zero). In such cases, a rule can involve applying the contract pool to the corresponding value in the shift ticket (e.g., technician has billed hours 89-115 where the pool was 100 hours total and thus the conforming value is 11 hours, or technician used 602 cubic feet of cement where the un-billed pool was 500 and thus the conforming value is 102). Allocations for material or labor adaptable for pools are discussed in U.S. Pat. No. 7,213,064 to Smith, the contents of which are incorporated by reference in their entirety.

Both contractor and customer derive benefit from consistent execution of user-defined rules. Rules can operate through software deployed for example in reconcile module 141. By executing rules, the invention provides methods of reconciling exceptions between or among time, inventory, labor, gatelog, activity, payroll, and billing data records or databases. Reconciliation methods adaptable for use with the invention are discussed in U.S. Pat. No. 8,321,313 to Livesay and U.S. Pat. No. 7,761,318 to Olson, the contents of each of which are incorporated by reference for all purposes.

Systems and methods of the invention are particularly valuable in that they resolve exceptions that are associated with transfer of data from gate 109 to contractor system 129. By integrating data records from a gate 109 at a customer facility with shift tickets 121 via integration module 137 a contractor is afforded the opportunity to discover and resolve exceptions with previously unavailable precision and accuracy. Additionally, since rules employed by reconcile module 141 can resolve exceptions to report a result that conforms to a standard (e.g., as embodied in contract 101), reconciliation according to the invention give the contractor and the customer greater satisfaction in the execution of contract 101. As diagrammed in FIG. 5, once a rule has been fired 209, system 129 can determine 213 if more exception are present. Once the exceptions have been resolved, system 129 can export allocations—i.e., values for time, materials, services, etc., for use in conforming reports 149. Methods described herein may be performed by computer systems that include one or more devices.

Figure 6:
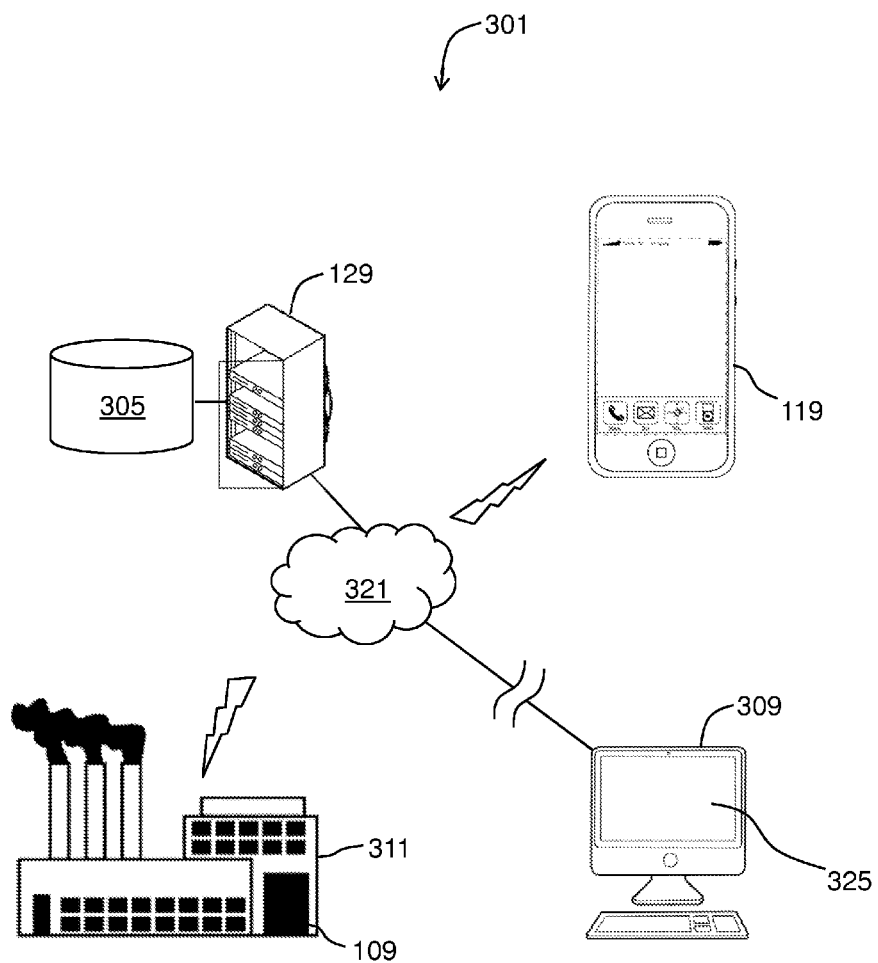
FIG. 6 illustrates components of systems of the inventions of certain embodiments.

FIG. 6 shows devices of a system 301 for performing methods of the invention. Contractor system 129 may optionally be coupled to digital storage system 305. Contractor system 129 receives information from device 119 and from customer's facility 311 (e.g., from gate 109) via communication network 321. System 301 may include a computer 309 for use by administrative personnel (e.g., of the contractor). Computer 309 may provide a display 325 that includes information allowing the administrator to work with system 129 to, for example, resolve any exceptions that are flagged for manual resolution.

Server 129 could include a rack-mounted computing device such as the server sold under the trademark BLADE by Hitachi (Santa Clara, Calif.). Computer 309 could be a computer device such as the PC sold under the trademark SERIES 9 by Samsung (Seoul, South Korea), a notebook or desktop computer sold by Apple (Cupertino, Calif.) or a desktop, laptop, or similar PC-compatible computer such as a Dell Latitude E6520 PC laptop available from Dell Inc. (Round Rock, Tex.). Such a computer will typically include a suitable operating system such as, for example, Windows 7, Windows 8, Windows XP, all from Microsoft (Redmond, Wash.), OS X from Apple (Cupertino, Calif.), or Ubuntu Linux from Canonical Group Limited (London, UK).

Any of server 129, device 119, or computer 309 will generally contain a memory operably coupled to a processor and an input/output mechanism.

Suitable memory may include, for example, one or more of a hard disk drive, solid state drive (SSD), an optical disc, flash memory, zip disk, tape drive, "cloud" storage location, or a combination thereof. Preferably, memory includes a tangible, non-transitory computer readable medium. Storing information (e.g., shift ticket 121, gatelog 113, activity report 111 in memory of system 129) involves transforming the tangible, non-transitory memory, for example, by adding, removing, or rearranging particles (e.g., with a net charge or dipole moment into patterns of magnetization by read/write heads), the patterns then newly representing objective physical phenomena (e.g., a physical arrangement of particles that indicates that a technician has entered a specific gate 109 at a particular time). In some embodiments, writing a file includes transforming a flash memory device and storing information by transforming physical elements in an array of memory cells made from floating-gate transistors.

A processor may be provided by one or more processors including, for example, one or more of a single core or multi-core processor (e.g., AMD Phenom II X2, Intel Core Duo, AMD Phenom II X4, Intel Core i5, Intel Core i& Extreme Edition 980X, or Intel Xeon E7-2820).

Input/output mechanism may include one or more of a video display unit (e.g., a liquid crystal display (LCD) or a cathode ray tube (CRT)), an alphanumeric input device (e.g., a keyboard), a cursor control device (e.g., a mouse, touchpad, trackpad), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, cellular modem, monitor, keyboard, mouse, data jack (e.g., Ethernet port, modem jack, HDMI port, mini-HDMI port, USB port), microphone, light (e.g., LED), light/image projection device, or a combination thereof.

In some embodiments, either of consumer computer 309, device 119, or server 1291 may be a tablet or smart-phone form factor device and a processor can be provided by, for example, an ARM-based system-on-a-chip (SoC) processor such as the 1.2 GHz dual-core Exynos SoC processor from Samsung Electronics, (Samsung Town, Seoul, South Korea).

Systems and methods of the invention can include instructions written in any suitable programming language known in the art, including, without limitation, C, C++, Perl, Java, ActiveX, HTML5, Python, Ruby on Rails, Visual Basic, or JavaScript. Programming in Java is discussed in Liang, Introduction to Java Programming, Comprehensive (8th Edition), Prentice Hall, Upper Saddle River, N.J. (2011) and in Poo, et al., Object-Oriented Programming and Java, Springer Singapore, Singapore, 322 p. (2008). A computer program may be developed in a development environment such as Ruby on Rails or Groovy and Grails. See, e.g., Metz, Practical Object-Oriented Design in Ruby: An Agile Primer, Addison-Wesley (2012). Additional methods relating to work durations or labor services that may be adapted for use with the invention are discussed in U.S. Pat. No. 8,121,912 to Pappas and U.S. Pub. 2003/0033167 to Arroyo, the contents of each of which are incorporated by reference for all purposes.

Server 129 may use storage 305 to house and operate a database. Any development environment, database, or language known in the art may be used to implement embodiments of the invention. In some embodiments, an object-oriented development language, database structure, or development environment is used. Exemplary languages, systems, and development environments for development and operation of a database include Perl, C++, Python, Ruby on Rails, JAVA, Groovy and Grails, Visual Basic .NET, Smalltalk, Objective C, and SQL.

In certain embodiments, systems and methods of the invention are implemented through the use of a mobile app (e.g., for generating shift ticket 121 on device 119). As used herein, mobile app generally refers to a standalone program capable of being installed or run on a smartphone platform such as Android, iOS, Blackberry OS, Windows 8, Windows Mobile, etc.

Figure 7:
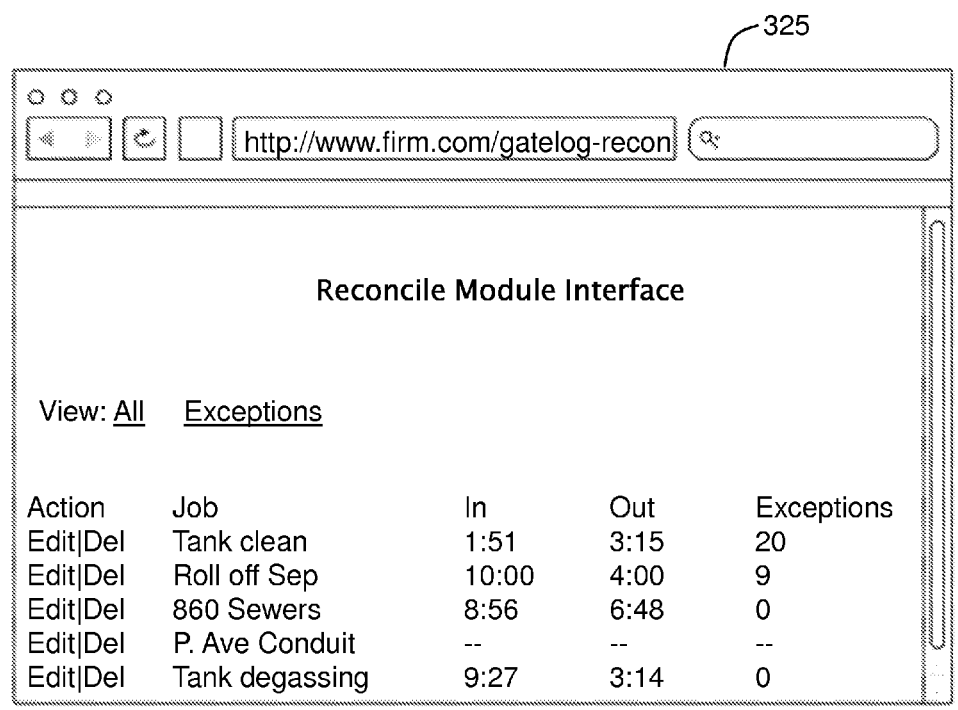
FIG. 7 represents a display for accessing modules of the invention.

FIG. 7 shows an exemplary display 325 that lists scheduled service events (i.e., grouped as shift tickets 121) along with information from gatelog 113 as well as information about any exceptions identified in connection with those events. Shift tickets 121 that are flagged with exceptions can easily be identified because display 325 shows the user the total number of exceptions at the job, shift ticket or employee day entry level. In addition to the exception summary, system 129 can also show details (e.g., via display 325) for each type of exception encountered (e.g., revealed by clicking Edit under Action).

For each exception, the administrator may provide corrections which then override the exception once they have taken steps to resolve the issue. For example, if an overtime exception was identified, the administrator could either specify that overtime was approved or acknowledge that the employee worked more hours than the contract specified, but that these were non-billable hours.

Figure 8:
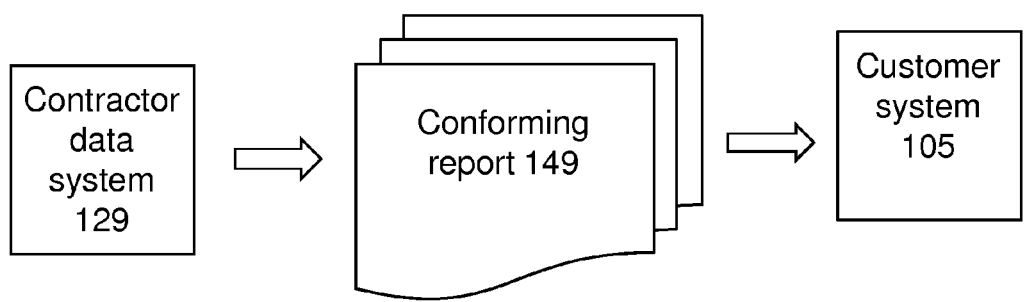
FIG. 8 gives an information flow result.

FIG. 8 depicts transmission of conforming report 149 to customer system 105. Preferably once any or all of the exceptions are resolved, system 129 produces and exports conforming report 149 to customer system 105. The report can be printed and mailed (e.g., by the administrator). Preferably, the report is transmitted electronically over network 321.

Systems of the invention eliminate the manual entry and manual reconciliation that prior art methods required to be performed daily. Systems and methods of the invention can reduce a formerly 4-12 hour process to under 2 hours, preferably to mere moments (e.g., fewer than five minutes or under a minute). Additionally, the invention eliminates keystroke errors that may take place during manual entry back into the customer's control system and increases billing efficiencies dramatically.

System 129 can assist any contractor in automating and improving the reconciliation and reporting process to the customer's control system, thereby reducing time involved in reconciliation via automation; consistently applying rules for reconciliation; and improving accuracy in the entire reporting and payment process.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for reconciling invoice data, the system comprising:
   a security device comprising a card reader at an entrance of a facility of a customer of a contractor, wherein activation of the security device by a technician generates a badge-in time and a badge-out time;
   a customer computer system in communication with the security device and operable to provide a gatelog comprising the badge-in time and the badge-out time;
   a contractor's computer system comprising a processor operable coupled to a tangible, non-transitory memory; and
   a network communication device operable to automatically receive transmit the gatelog from the customer computer system to the contractor's computer system, wherein the contractor's computer system is operable to:
   receive an activity report comprising an approved time for billing, a shift ticket comprising a reported billable time, and the gatelog comprising the badge-in time and the badge-out time, wherein the activity report and the gatelog are received from the customer computer system;
   automatically determine a work duration based on the badge-in time and the badge-out time;
   automatically identify a difference among the approved time for billing, the reported billable time, and the work duration;
   automatically apply a rule to the difference to determine a conforming billable time;
   automatically produce a conforming report comprising the conforming billable time; and
   use the conforming report in billing the customer for work done by the contractor.

2. The system of claim 1, further wherein the billing the customer comprises operating the network communication device to transmit the conforming report to the customer computer system.

3. The system of claim 1, wherein the activity report includes an approved equipment list and the shift ticket comprises a list of equipment used, and further wherein the computer system comprises a module operable to:
   make a comparison between the list of equipment used and the approved equipment list; and
   apply a rule to the comparison to determine a final equipment list, and further wherein the conforming report includes the final equipment list.

4. The system of claim 1, wherein the rule provides that the approved time for billing will be the conforming billable time unless the work duration is less than the approved time for billing by a preset threshold.

5. The system of claim 4, wherein the preset threshold is zero.

6. The system of claim 1, wherein the rule provides that the conforming billable time will be the higher of the approved time for billing and the reported billable time except that in no case will the conforming billable time exceed the work duration.

7. The system of claim 1, further comprising a mobile computing device operable to be used by the technician on-site at the facility to record hours worked and provide the shift ticket comprising the reported billable time to the contractor's computer system.

8. The system of claim 7, wherein the mobile computing device is a ruggedized tablet PC comprising a touch screen for receiving information from the technician.

* * * * *